United States Patent [19]

Gravdahl

[11] 4,041,458
[45] Aug. 9, 1977

[54] ARRANGEMENT FOR CARRYING OUT RANDOM SELECTION AMONG A PLURALITY OF SELECTABLE DEVICES IN A TELECOMMUNICATION SYSTEM

[75] Inventor: Eugen Gravdahl, Hagersten, Sweden

[73] Assignee: Telefonaktiebolaget L M Ericsson, Stockholm, Sweden

[21] Appl. No.: 727,025

[22] Filed: Sept. 27, 1976

[30] Foreign Application Priority Data

Oct. 17, 1975 Sweden .................. 7511664

[51] Int. Cl.² .................................. H04Q 3/42
[52] U.S. Cl. .................. 340/166 R; 340/147 LP; 179/18 G
[58] Field of Search ............ 340/166 R, 147 LP; 179/18 G, 18 GF, 18 EA, 18 J

[56] References Cited

U.S. PATENT DOCUMENTS

| 3,860,761 | 1/1975 | O'Neill | 179/18 G |
| 4,004,103 | 1/1977 | Liu | 179/18 GF |

Primary Examiner—Harold I. Pitts
Attorney, Agent, or Firm—Hane, Sullivan & Spiecens

[57] ABSTRACT

Arrangement in a telecommunication system for random choice of one of a number of selectable devices, the condition of which is marked by the condition of a marking wire connected to the respective device. The selection is made by a selector chain consisting of a number of selector circuits each connected to its own wire. Activation of one of the circuits in the chain prevents the other circuits in the chain from activating, in order to cause that only one device at a time can be choosen. Each selector circuit contains a logic circuit with bistable characteristics. To the input of each selector circuit is connected a gate circuit which is activated on a first input by a signal from a marking wire and on a second input by a pulse from a pulse oscillator individual for each gate circuit. The pulse oscillators are working on slightly different frequencies and thus delivering signals at different moments. When the gate circuit is activated, said signal from the marking wire is forwarded to the selector circuit. That one of the selector circuits which first has received said marking wire signal will then be choosen and the device associated with said selector circuit will be occupied. The random choice is determined by a combination of the time for the call and by the moment in which a pulse from a pulse oscillator occurs.

3 Claims, 2 Drawing Figures

ARRANGEMENT FOR CARRYING OUT RANDOM SELECTION AMONG A PLURALITY OF SELECTABLE DEVICES IN A TELECOMMUNICATION SYSTEM

BACKGROUND OF THE INVENTION

The present invention refers to an arrangement for random selection of one among a plurality of devices which are marked as selectable by the condition of marking wires in a telecommunication system by means of a selecting chain consisting of a number of selecting circuits each connected to its own line, activation of a selecting circuit in the selecting chain preventing activation of other selecting circuits belonging to the chain in order to prevent that upon simultaneous call of several selecting circuits in the selecting chain that one of the selecting circuits which due to the characteristics of its components is most rapid always is selected first. The problem which has to be solved is consequently to prevent an uneven load and a rapid wear of the devices which are selected more often. Furthermore it is necessary to secure that only one device can be selected at the same time.

In previously known solutions, for example the Swedish Pat. No. 302 791, a special kind of selecting chain is used in order to secure that only one device can be selected at the same time. This method does not, however, result in random distribution in view of the selection of the devices and the problem of uneven load of the devices is still not solved.

According to the Swedish Pat. No. 182 638 an automatically stepping selecting chain is used which is built up of monostable flip-flops. The drawback with this arrangement is, however, that it steps forward with a constant velocity and there is a risk that after a long sequence of busy marked devices a certain idle device has priority compared with the others.

According to the invention said problem is solved. The invention is defined in the enclosed claims.

BRIEF DESCRIPTION OF THE DRAWINGS

The invention will be described more in detail by means of an embodiment with reference to the enclosed drawings in which.

DESCRIPTION OF THE PREFERRED EMBODIMENT

Figure 1:
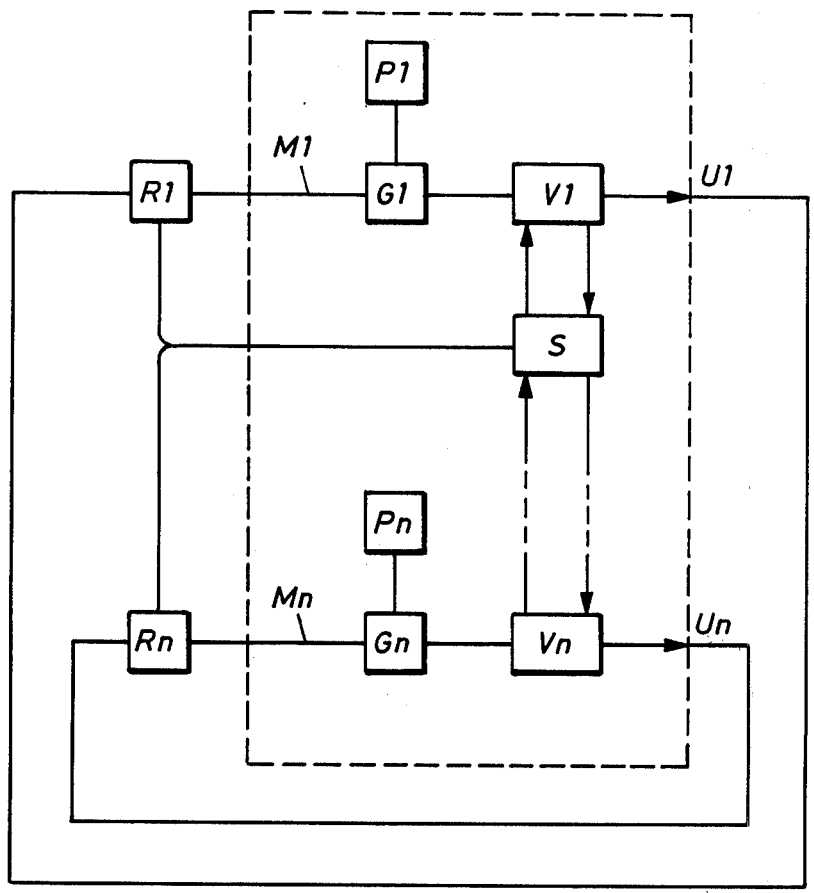
FIG. 1 shows a block diagram of the arrangement according to the invention and FIG. 2 shows a circuit diagram of the selecting circuit.

FIG. 1 shows a number of selecting circuits V1-Vn each connected to a marking wire M1-Mn which each belongs to a device R1-Rn which has to be selected, each marking wire having a potential condition which indicates whether the respective device can be selected or not. Each selecting circuit comprises a logical circuit having bistable characteristics in order to be set upon obtaining an input from the marking wire and to supply on the output U1-Un a signal which seizes the device R1-Rn belonging to the marking wire. The selecting circuit also generates a blocking potential which is supplied to a blocking means S common for all the selecting circuits and which in turn supplies a blocking signal to all the other selecting circuits in order to prevent their activation.

Each selecting circuit obtains its input signal from the marking wires M1-Mn through an AND-circuit G1-Gn which is connected to the input of the respective selecting circuit and one of the inputs of said AND-circuit is activated by the potential condition which exists on the marking wire when the circuit is selectable and the second input of said AND-circuit is activated by a pulse from a pulse oscillator P1-Pn separately connected to each AND-circuit so that said circuit is activated only during the pulse.

The pulse oscillators are working continuously at frequencies which differ somewhat from each other so that the pulse flanks occur at different times and one of the AND-circuits is at random activated before the others. Upon a call to the selecting chain the marking wires of the selectable devices are activated and that one of the selecting circuits is selected the AND-circuit of which is simultaneously activated by a pulse from its associated pulse oscillator.

In order to prevent that further selecting circuits are activated the selected selecting circuit sends a blocking signal to the common blocking means S which blocks all the other selecting circuits. As the pulse oscillators, as previously mentioned, are working at somewhat different frequencies the pulses from said oscillators will be delivered at different times and a random selection of devices is obtained, the selection being controlled by a combination between the time of a call and the fact which pulse oscillator is just delivering a pulse at that time. However, if nevertheless two selecting circuits should be simultaneously activated the blocking potential is so adapted that always that one of the selecting circuits is selected which is more rapid due to the characteristics of its components. This implies, however, no drawback as the two simultaneously activated selecting circuits have been selected at random and consequently one of these circuits only at random will be the most rapid selecting circuit of the group.

Figure 2:
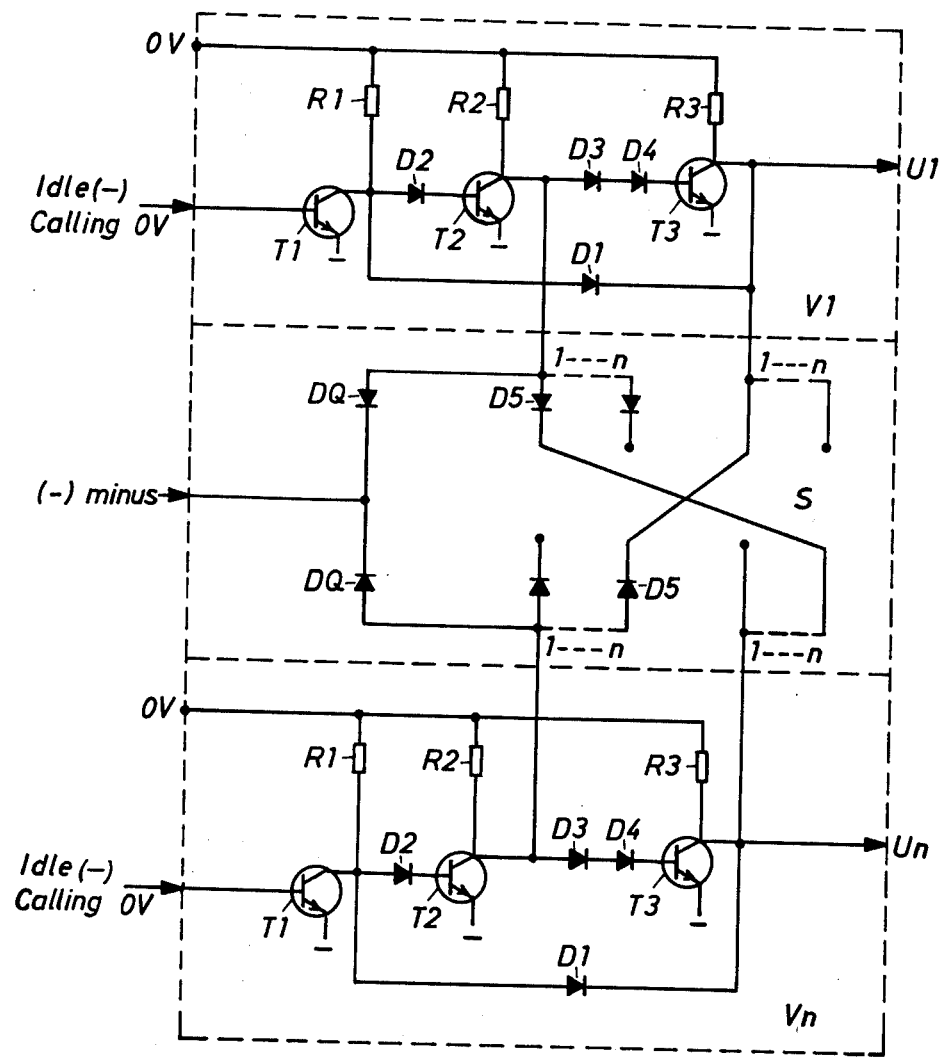

In FIG. 2 is shown the circuit diagram of a selecting circuit. From the diagram appears also the blocking function to block the other selecting circuits.

In idle condition a transistor T1 is blocked in the selecting circuit V1 when a negative potential occurs at the base which is the input of the selecting circuit. At the collector of the transistor T1 then occurs a positive potential which through a diode D2 brings a transistor T2 into conducting state. The positive potential which occurs at the collector of the transistor T2 is, however, after a potential drop through a resistance R2 to small for bridging over the resistance in two diodes D3-D4 connected in series and in a transistor T3. The transistor T3 will consequently remain non-conducting and it does not supply any seizure signal to the respective device at the output.

Upon a call a positive potential occurs at the base of the transistor T1 in consequence of which the transistor will be conducting. Due to potential drop over a resistance R1 the positive signal at the collector of the transistor T1 will, however, be too low so that it cannot bridge over the resistance in the diode D2 and in the transistor T2 which is blocked in turn. Now a positive signal occurs at the collector of the transistor T2 which is sufficient to make the transistor T3 conducting upon which from the output of the selecting circuit a signal is obtained which seizes the selected device. When the calling signal disappears the selecting circuit obtains holding through a diode D1 and the transistor T2 remains blocked due to the potential drop through said diode. The holding is continued during the remaining time until the device to which the selecting circuit belongs has been occupied.

A blocking signal to the other circuits is obtained in the following manner: If for example of all the selecting circuits the circuit Vn has been activated later than the selecting circuit V1, a positive potential is applied to the collector of the transistor T2 in the circuit Vn which is higher than the potential which is applied to the collector of the transistor T3 in the selecting circuit V1. A current is now passing from the collector of the transistor T2 in the selecting circuit Vn through the diode D5 belonging to the selecting circuit V1 in the blocking means S to the transistor T3 in the selecting circuit V1. The potential at the collector of the transistor T2 in the selecting circuit Vn is then decreasing and will be too low for bridging over the resistance of the diodes D3-D4 and the transistor T3. The transistor T3 is now blocked and no signal is going out from the selecting circuit Vn.

After that the connection has been set up the selecting circuit V1 is restored to idle position by a negative signal supplied from the busy means R1 to the common blocking means S. This negative signal is supplied through a diode DQ to the anode of the diode D3 so that the transistor T3 is blocked in the activated selecting circuit V1 in consequence of which the latter looses the holding through the diode D1 and returns to its idle position. In consequence of this the potential of the cathodes of the diodes D5 increases so that the blocking condition of all the other selecting circuits ceases and they are selectable again.

It appears from the described procedure that there is a possibility to select by means of an arrangement according to the invention one of a number of idle marked devices or one of a number of simultaneously calling devices.

An arrangement according to the invention is very rapid upon selection of one of a plurality of devices and furthermore it can easily be built out for very large selecting chains.

We claim:

1. Arrangement in a telecommunication system for random selection of one among a plurality of devices each being associated with a marking wire indicating by its condition whether said device is selectable or not containing, a selecting chain consisting of a number of switching circuits each connected to one of said devices, means in each switching circuit for preventing upon activation of one of said circuits activation of other switching circuits of the chain, a logical circuit with bistable characteristics included in each switching circuit, a gate circuit being connected to the input of each switching circuit which gate circuit at a first input is activated by the condition of said marking wire, one pulse signal source for each of said gate circuits sending pulses to a second input of the gate circuit, said pulse sources having slightly different frequencies in order to achieve a random transmission of a conditioning signal from the marking wires to the switching circuits so that upon simultaneous activation of several marking wires it is prevented that that one of the switching circuits which due to the characteristics of its components is most rapid always is selected first.

2. Arrangement according to claim 1 in which the frequencies of said pulse sources are selected according to a required priority order a source associated with a wire belonging to a device of higher priority having a higher frequency and a source associated with a wire belonging to a device of lower priority having a lower frequency.

3. Arrangement according to claim 1, in which a pulse from one of said sources associated with a wire belonging to a device of higher priority having a longer duration and a pulse from one of said sources associated with a wire belonging to a device of lower priority having a shorter duration.

* * * * *